(12) United States Patent
Krahl et al.

(10) Patent No.: US 11,367,366 B2
(45) Date of Patent: Jun. 21, 2022

(54) 2-PLY PRINTER TAPE

(71) Applicant: McAuliffe Paper Inc., Liverpool, NY (US)

(72) Inventors: William R. Krahl, Baldwinsville, NY (US); Charles Thiaville, Manlius, NY (US)

(73) Assignee: McAuliffe Paper Inc., Liverpool, NY (US)

( * ) Notice: Subject to any disclaimer, the term of this patent is extended or adjusted under 35 U.S.C. 154(b) by 0 days.

(21) Appl. No.: 15/930,791

(22) Filed: May 13, 2020

(65) Prior Publication Data

US 2021/0358335 A1    Nov. 18, 2021

(51) Int. Cl.
    *G09F 3/02*     (2006.01)
    *G09F 3/00*     (2006.01)
    (Continued)

(52) U.S. Cl.
    CPC .............. *G09F 3/0288* (2013.01); *C09J 7/29* (2018.01); *C09J 7/403* (2018.01); *G09F 3/0292* (2013.01); *C09J 2203/334* (2013.01); *C09J 2203/338* (2013.01); *G09F 2003/0202* (2013.01); *G09F 2003/0241* (2013.01); *G09F 2003/0248* (2013.01); *Y10T 428/1476* (2015.01)

(58) Field of Classification Search
    CPC .................. G09F 3/0288; G09F 3/0292; G09F 2003/0248; G09F 2003/0241; G09F 2003/0202; C09J 7/403; C09J 7/29; C09J 2203/338; C09J 2203/334; Y10T 428/1476
    See application file for complete search history.

(56) References Cited

U.S. PATENT DOCUMENTS 3,312,005 A * 4/1967 McElroy .................. G09F 3/10
                                                    40/638
5,336,541 A * 8/1994 Kobayashi ............... G09F 3/02
                                                    428/41.8
(Continued)

FOREIGN PATENT DOCUMENTS

DE         2849960 A1    5/1980
KR       101514450 B1    4/2015

OTHER PUBLICATIONS

PCT International Search Report and Written Opinion of the International Searching Authority for PCT/US 21/31220 dated Aug. 12, 2021 (15 pages).

*Primary Examiner* — Patricia L. Nordmeyer
(74) *Attorney, Agent, or Firm* — Harris Beach PLLC

(57) ABSTRACT

A printable 2-PLY security tape includes a first tape PLY label stock. A first substrate has a printable outer surface as a first outer PLY surface. A first inner PLY surface includes at least one first release area disposed on an inside surface of the first substrate, and at least one first adhesive area is disposed on the inside surface of the first substrate. A second tape PLY security tape includes a second substrate outer surface as a second outer PLY surface. A second inner PLY surface includes at least one second release area disposed on an inner surface of the second substrate, and at least one second adhesive area disposed on the inner surface of the second substrate. The second adhesive area is in contact with the first release area and the first adhesive area in a contact with the second release area, to form a 2-PLY composite tape.

19 Claims, 9 Drawing Sheets

(51) Int. Cl.
*C09J 7/40* (2018.01)
*C09J 7/29* (2018.01)

(56) References Cited

U.S. PATENT DOCUMENTS

| | | |
|---|---|---|
| 5,366,087 A | 11/1994 | Bane |
| 5,829,789 A | 11/1998 | Treleaven et al. |
| 5,951,054 A | 9/1999 | Hagen et al. |
| 6,447,015 B1 | 9/2002 | Linnewiel |
| 6,596,359 B2 * | 7/2003 | Roth ................. B31D 1/021 156/250 |
| 6,637,775 B1 | 10/2003 | Bernier et al. |
| 2005/0179548 A1 | 8/2005 | Kittel et al. |
| 2007/0026184 A1 | 2/2007 | Ehreiser et al. |
| 2007/0267146 A1 | 11/2007 | Vigunas et al. |
| 2008/0063842 A1 | 3/2008 | Callinan et al. |
| 2009/0233035 A1 | 9/2009 | Wang |
| 2011/0020641 A1 | 1/2011 | Shroff et al. |
| 2013/0260991 A1 | 10/2013 | Van Boom et al. |
| 2016/0009438 A1 * | 1/2016 | Binladen ............... B65C 9/1803 156/191 |
| 2017/0080684 A1 | 3/2017 | Singh et al. |

* cited by examiner

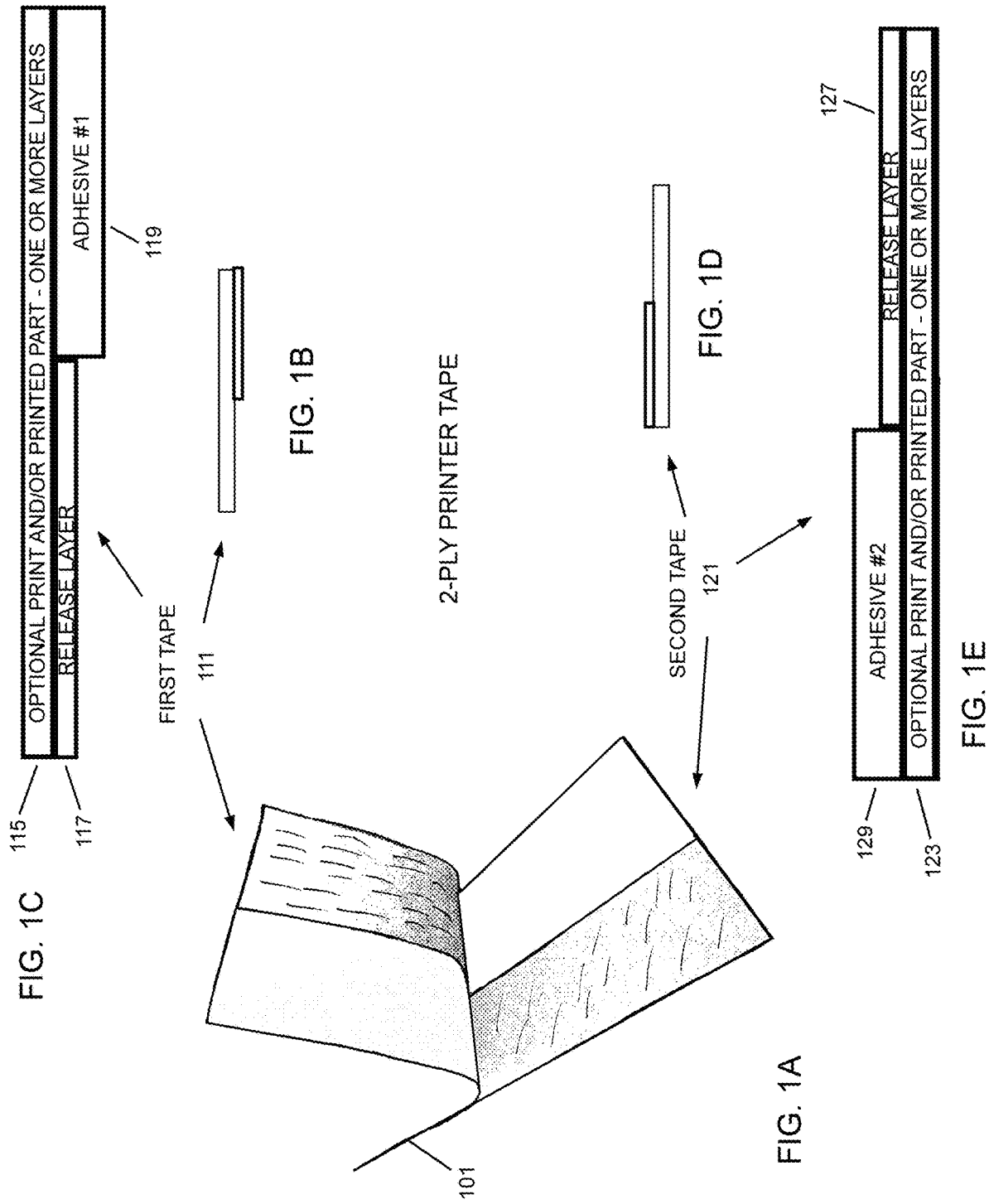

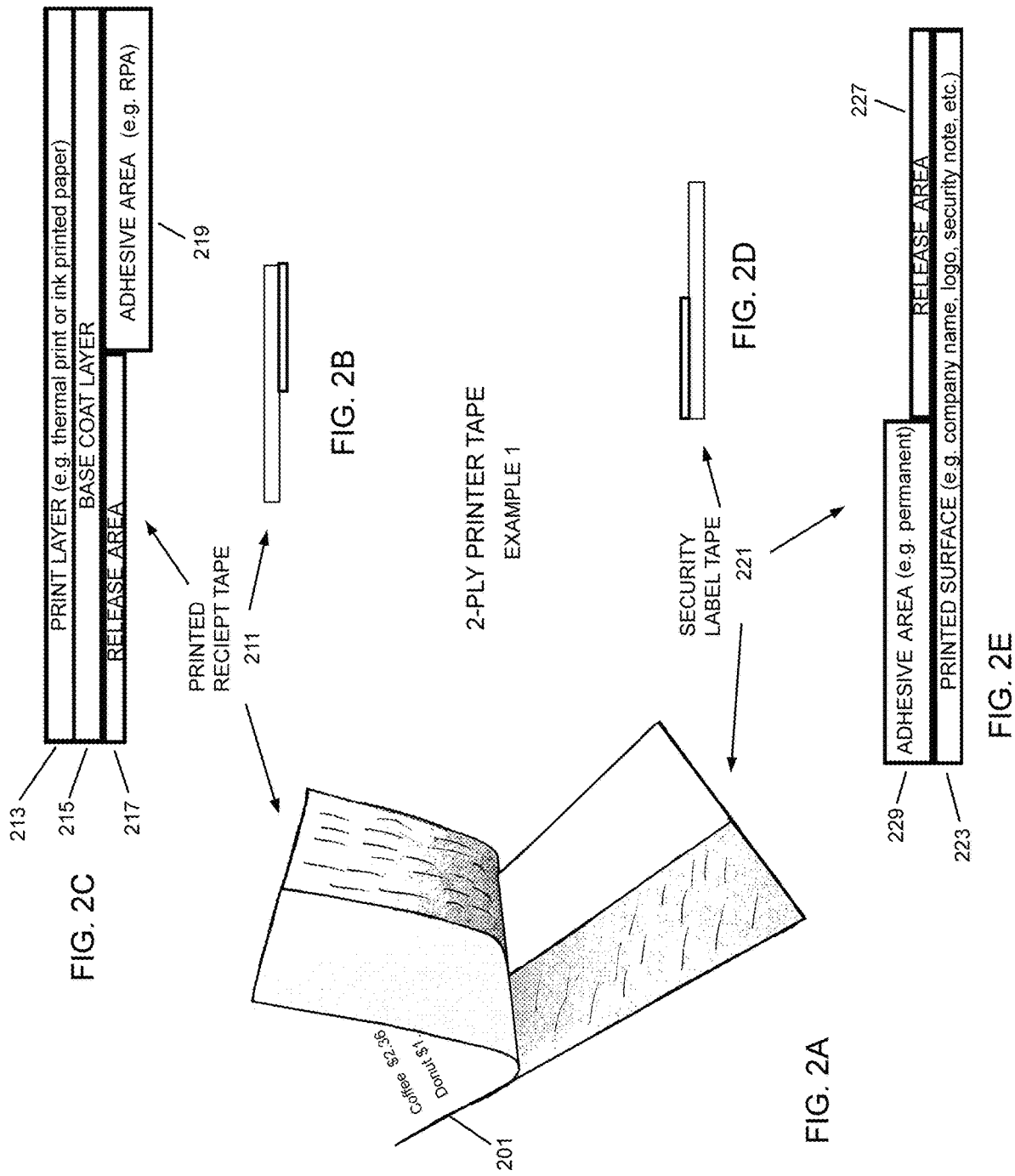

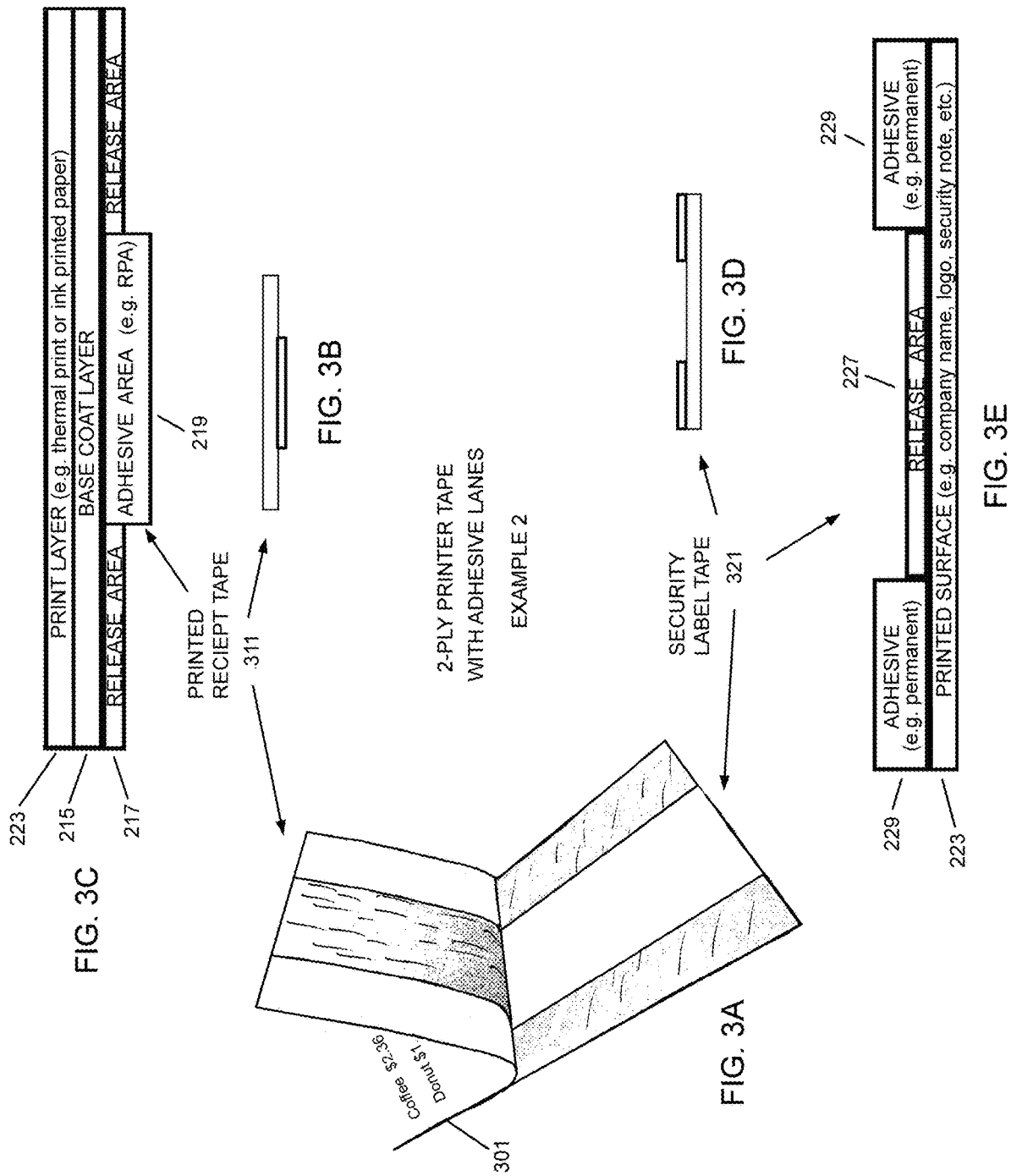

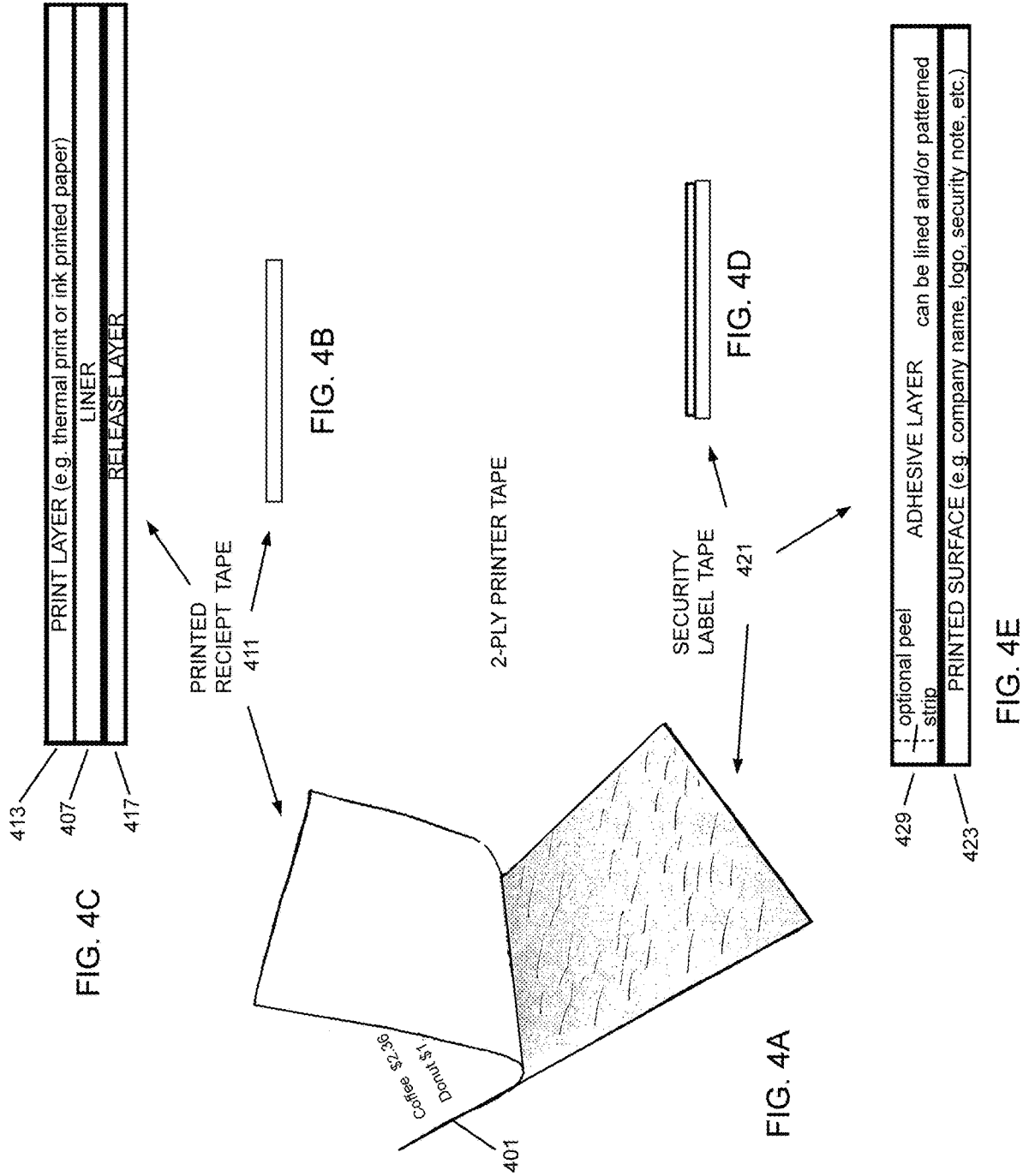

2-PLY PRINTER TAPE

FIELD OF THE APPLICATION

The application relates to printer tapes, particularly to printer tapes used for purchase receipts, including printer tapes having adhesive on one side of the tape that can be adhered to a purchased product or package. The application further relates to printer tapes for use as tamper-proof or tamper-evident security tapes to seal packaging for a purchased product.

BACKGROUND

Sales register printer tapes as purchase receipts are handed to a customer following a product purchase or provided in or on a bag or package containing the purchase product. Linerless label media is frequently used in certain industries, such as quick service restaurants, to print receipts and work orders that can be adhered to a purchased product, packaging or goods in process. Often, a bag or package in which a purchased product is placed can be further protected by a security label that provides evidence that it has been reopened or tampered.

SUMMARY

A printable 2-PLY security tape includes a first tape PLY label stock that includes a first substrate having a first substrate printable outer surface as a first outer PLY surface. A first inner PLY surface includes at least one first release area disposed on an inside surface of the first substrate, and at least one first adhesive area is disposed on the inside surface of the first substrate. A second tape PLY security tape includes a second substrate having a second substrate outer surface as a second outer PLY surface. A second inner PLY surface includes at least one second release area disposed on an inner surface of the second substrate, and at least one second adhesive area disposed on the inner surface of the second substrate. When the individual tape PLIES are assembled into a 2-PLY tape, the second adhesive area is in contact with the first release area and the first adhesive area in a contact with the second release area, to form a 2-PLY composite tape.

The printable 2-PLY security tape can include a pre-printed printable outer surface.

The printable 2-PLY security tape can include a pre-printed security tape.

Either or both of the at least one first adhesive area and the at least one second adhesive area can include one or more lanes.

Either or both of the at least one first adhesive area and the at least one second adhesive area can include a plurality of adhesive areas arranged in one or more adhesive patterns.

The plurality of adhesive patterns can include at least a selected one of dots, squares, triangles, stars, polygons, ovals, circles, rectangles, lines, diamonds and combinations thereof. The plurality of adhesive patterns can include diagonal adhesive lines or adhesive lines as chevrons.

Either or both of the first tape PLY label stock and the second tape ply security tape can include an area free of adhesive as a peel strip.

There can be a lane free of any adhesive disposed between the first adhesive area and the second adhesive area.

Both exposed outer surfaces of the 2-PLY security tape are substantially adhesive free to reduce or substantially eliminate adhesive fouling of a tape track and/or cutting mechanism of a printer.

A 2-PLY composite tape includes a first tape PLY which includes a first substrate having a first substrate outer surface as a first outer PLY surface. A first inner PLY surface includes at least one first release area disposed on an inside surface of the first substrate, and at least one first adhesive area disposed on the inside surface of the first substrate. A second tape PLY includes a second substrate having a second substrate outer surface as a second outer PLY surface. A second inner PLY surface includes at least one second release area disposed on an inner surface of the second substrate, and at least one second adhesive area disposed on the inner surface of the second substrate. The second adhesive area is in contact with the first release area and the first adhesive area in a contact with the second release area, to form a 2-PLY composite tape.

At least one of the first substrate outer surface and the second substrate outer surface can include a printed or printable surface.

The first tape PLY includes a printable receipt tape, and the second tape PLY can include a security tape.

The first tape PLY is removably coupled to the second tape PLY such that following a printing of the first tape PLY of the printable receipt tape, the second tape PLY is removable from the 2-PLY composite tape as an adhesively backed security label.

The first tape PLY of the printable receipt tape can include a repositionable adhesive (RPA).

The RPA is disposed on an interior surface of the first tape PLY in one or more continuous or discontinuous longitudinal strips or lanes of a continuous or patterned adhesive.

The second tape PLY of the security tape can include a permanent adhesive.

The permanent adhesive is disposed on an interior surface of the second tape PLY in one or more continuous or discontinuous longitudinal strips or lanes of a continuous or patterned adhesive.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1A is a drawing showing an exemplary 2-PLY tape according to the Application;

FIG. 1B is a drawing showing the receipt part of the 2-PLY tape of FIG. 1A;

FIG. 1C is a drawing showing exemplary layers of the receipt part of the 2-PLY tape of FIG. 1A;

FIG. 1D is a drawing showing the security tape part of the 2-PLY tape of FIG. 1A;

FIG. 1E is a drawing showing exemplary layers of the security tape part of the 2-PLY tape of FIG. 1A;

FIG. 2A is a drawing showing an exemplary 2-PLY tape according to the Application;

FIG. 2B is a drawing showing the receipt part of the 2-PLY tape of FIG. 1A;

FIG. 2C is a drawing showing exemplary layers of the receipt part of the 2-PLY tape of FIG. 1A;

FIG. 2D is a drawing showing the security tape part of the 2-PLY tape of FIG. 1A;

FIG. 2E is a drawing showing exemplary layers of the security tape part of the 2-PLY tape of FIG. 2A;

FIG. 3A is a drawing showing another exemplary 2-PLY tape according to the Application;

FIG. 3B is a drawing showing the receipt part of the 2-PLY tape of FIG. 3A;

FIG. 3C is a drawing showing exemplary layers of the receipt part of the 2-PLY tape of FIG. 2A;

FIG. 3D is a drawing showing the security tape part of the 2-PLY tape of FIG. 2A;

FIG. 3E is a drawing showing exemplary layers of the security tape part of the 2-PLY tape of FIG. 3A;

FIG. 4A is a drawing showing yet another exemplary 2-PLY tape according to the Application;

FIG. 4B is a drawing showing the receipt part of the 2-PLY tape of FIG. 4A;

FIG. 4C is a drawing showing exemplary layers of the receipt part of the 2-PLY tape of FIG. 4A;

FIG. 4D is a drawing showing the security tape part of the 2-PLY tape of FIG. 4A;

FIG. 4E is a drawing showing exemplary layers of the security tape part of the 2-PLY tape of FIG. 4A;

DETAILED DESCRIPTION

Definitions

Figure 1F:
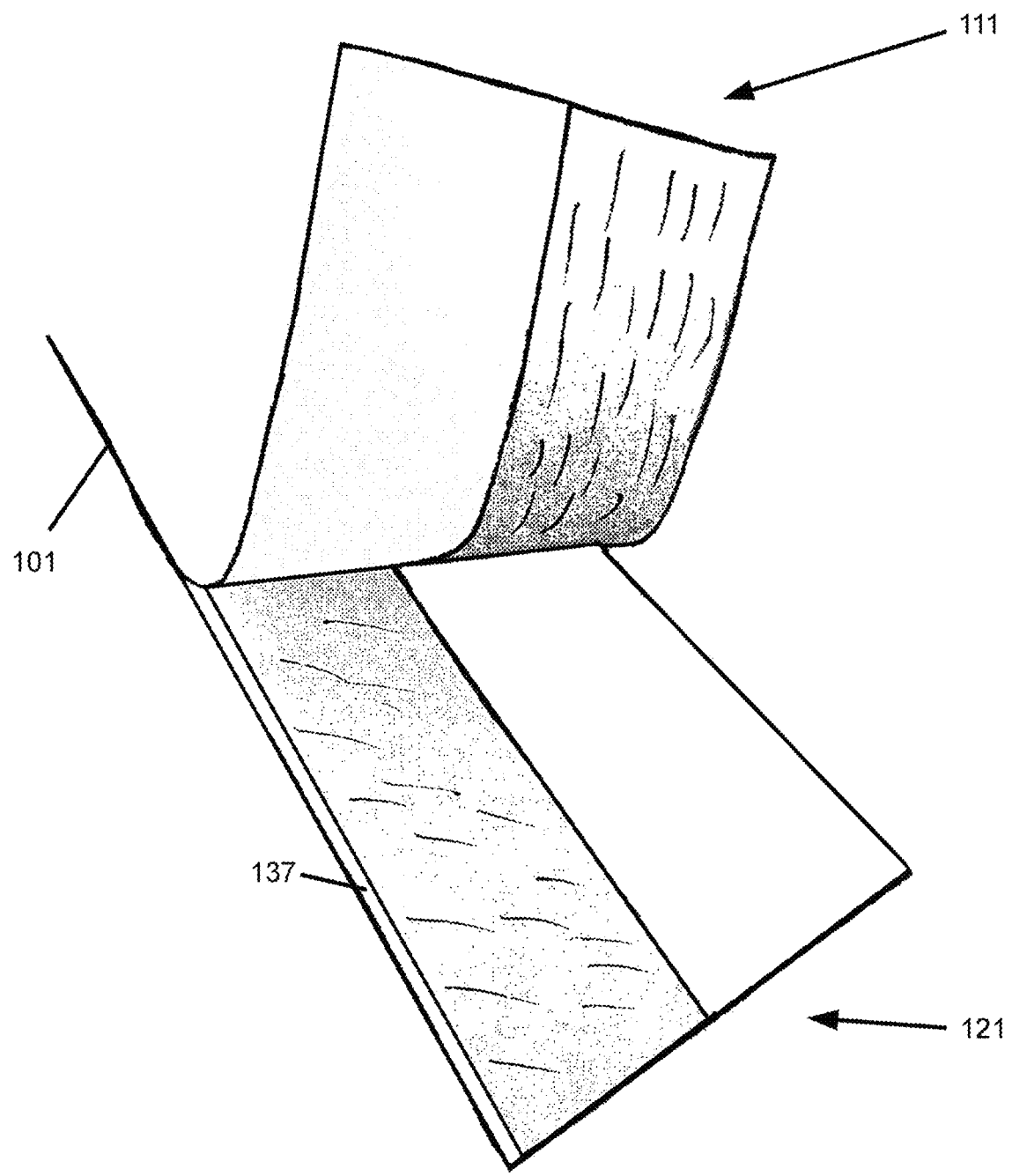
FIG. 1F is a drawing showing the 2-PLY tape of FIG. 1A with an optional peel strip on the edge of the second tape.

Tape—a tape can be a rolled or folded stock that is typically dispensed by a machine. Tapes can be pre-printed on one or both sides. Tapes can include one or more printable sides. Printable tapes can be printed by a printer. The printer can be a thermal printer, thermal transfer printer, laser printer, inkjet printer, impact printer or any other type of printer generally used to print receipts, work orders or labels. An example of a common printer type is a point of sale (POS) printer, many of which are thermal POS printers. Printer tapes for use in thermal printers will include a layer of thermos-reactive inks or dyes to form the image as is well known in the art. Similar terms for tape include label stock, tape stock, media stock, tape media, and label media.

Labels—Tapes are typically divided into relatively small parts, such as a receipt and/or a security label torn, cut, or otherwise separated from a tape. Labels typically, but not necessarily include an adhesive backing covering at least a part of the sticky side of the label. An adhesive can be selected, modified and applied in such a way that the resulting label may be permanently, removably or repositionably adhered to a surface. A label can also be affixed to a surface without adhesive, such as for example, but stapling a receipt to a bag. Labels can be of fixed same or fixed different lengths, such as by pre-scoring a tape. Alternatively, labels can be of variable continuous length dependent upon the length of the printing on the receipt or label, and typically can be manually cut (e.g. a tear bar), or automatically cut by a cutting knife of a label dispenser or printer.

Security label, security tape—A security application typically includes a label or tape that is temper evident or tamper proof. For example, an adhesive may be selected, modified and/or applied to be sufficiently strong enough to tear the surface to which it is applied when a security label or security tape is attempted to be or is partially removed, thereby providing evidence of tampering. Alternatively, the security label or security tape may be formed of a substrate designed to noticeably tear and/or cannot be reattached without visible evidence of a previous tear. For example, partial slits which do not completely transverse the substrate of the security label or the security tape may be used to reduce the force needed to noticeably tear. A security label or security tape can be of any suitable length from a relatively short label to a longer security tape sufficient to close a bag or packaging containing, for example, a purchased good.

Area on a surface—An area on a surface can be exclusive or overlapped. In the context of the Application, typically an area of a surface can be coated by an adhesive, and another area of the surface can be coated by a release coating.

However, there can be a release layer that covers most, or substantially all of a surface, and then a first adhesive area can be disposed over part or all of the release layer, such as where the first adhesive strongly adheres to the release layer. In this less common case, the release layer is not a release layer for the adhesive deposited thereon, but for another second type of adhesive to be set against the remaining exposed area of the release layer not covered by the first adhesive.

As described hereinabove, sales register printer tapes as purchase receipts can be handed to a customer following a product purchase or provided in or on a bag or package containing the purchase product. Often, the bag or package are further protected by a security label. Typically, a register, such as a point of sale (POS) register prints the purchase receipt, which is then either attached to the purchased product, placed in a bag or package holding the sale product, or handed to the customer who purchased the product. Often a second security label is used to close product bag or package. The security labels may be preprinted and precut or perforated or scored at tear points.

It was realized that there can be a 2-PLY tape, which includes and provides two same or different labels from one tape. There can be two tapes, each with its own adhesive layer.

It was realized that there can be a 2-PLY tape, which includes and provides both of the receipt and the security label from one tape. The 2-PLY tape can be, for example, a point of sale (POS) register tape. FIG. 2A to FIG. 3E show exemplary 2-PLY tapes which include both of the receipt and the security label in one tape.

In an alternative embodiment, as shown in FIG. 4A to FIG. 4E, there can be a 2-PLY tape where one tape has an adhesive layer, and the other does not. However, different from a tape of the prior art, what was previously a discarded liner, can now be the printed tape, while the ply with the adhesive can be used for another application, such as, for example, for a security tape.

In various embodiments, the 2-PLY tape includes and provides two labels from one tape. One tape can be a printed receipt or work order to be attached to a package disclosing the items purchased and/or an address or location for delivery of the goods. Another tape may be suitable to seal or close a package in a manner that provides visible evidence to the recipient of the package whether it has been opened and/or whether items within the package have been tampered with or removed.

FIG. 1A is a drawing showing an exemplary 2-PLY tape 101 according to the Application. The printed side of both of the receipt printed by, for example, a point of sale or register printer, and the security tape, typically pre-printed are visible on the outside top and bottom surfaces of the 2-PLY tape. For example, the outer surface of the tape that functions as a security tape may be preprinted with a logo for a store, restaurant, delivery service or to provide notice to the recipient how to determine whether the packages has been opened in transit. The point of sale or register printer prints the receipt and/or address for delivery on any suitable type receipt surface by any suitable printing means. For example, it is common to print receipts by a thermal print technique onto a thermally sensitive layer. However, the top layer could be paper or an equivalent material suitable to accept a printed ink from a thermal transfer, laser or ink jet printer. FIG. 1B is a drawing showing the receipt part of the 2-PLY tape of FIG. 1A. FIG. 1C is a drawing showing exemplary layers of the receipt part of the 2-PLY tape of FIG. 1A. FIG. 1D is a drawing showing the security tape part of the 2-PLY tape of FIG. 1A. FIG. 1E is a drawing showing exemplary layers of the security tape part of the 2-PLY tape of FIG. 1A.

As can be seen in FIG. 1A, following printing, the 2-PLY tape of FIG. 1A pulls apart yielding a first tape 111, and a second tape 121. Once separated, the first tape 111 can be used for a first purpose, for example as a receipt or delivery label. Similarly, the second tape 121 can be used for a second purpose, for example as a security tape.

According to FIG. 1A to FIG. 1E, the 2-PLY tape pulls apart where the adhesive of the first tape is on one side of the tape in the long or longitudinal direction of the tape, and the adhesive of the second tape is on the other side. It is unimportant if either or both sides meet in the middle and/or if there are areas clear of adhesive on either outer side of one or both of the strips in the long direction (not shown in FIG. 1A to FIG. 1E). As described in more detail herein below, either or both longitudinal extents of adhesive (continuous, non-continuous and/or patterned) can be made narrower (e.g. FIG. 1G) to ease registration issues during the steps of manufacture.

FIG. 1C is a drawing showing the first tape 111 and the second tape 121, each with an adhesive layer. First tape 111 has a first adhesive area 119 of an adhesive #1. Second tape 121 has an adhesive area of an adhesive #2. Depending on the intended applications for first tape 111 and second tape 121, adhesive #1 may be the same adhesive material as adhesive #2 or may have a different adhesive than adhesive #2. Similarly, release layers 117 and release area 127 can be of the same release area material, or of a different release area material. Release area 117 is of any release material suitable to release from adhesive 129. Release area 127 is of any release material suitable to release from adhesive 119.

In summary, and with reference to FIG. 1A to FIG. 1E, generally, a printable 2-PLY security tape 101 includes a first tape PLY label stock 111 which includes a first substrate 115 having a first substrate printable outer surface as a first outer PLY surface. A first inner PLY surface includes at least one first release area 117 disposed on an inside surface of the first substrate, and at least one first adhesive area 119 is disposed on the inside surface of the first substrate. A second tape PLY security tape 121 includes a second substrate 123 having a second substrate outer surface as a second outer PLY surface. A second inner PLY surface includes at least one second release area 127 disposed on an inner surface of the second substrate, and at least one second adhesive area 129 disposed on the inner surface of the second substrate. When the individual tape PLIES are assembled or laminated into a 2-PLY tape, the second adhesive area 129 is in contact with the first release area 117 and the first adhesive area 119 in a contact with the second release area 127, to form the 2-PLY composite tape 101.

Peel edge—There can be a strip along either edge of first tape 111 and/or second tape 121 to facilitate pulling the 2-PLY tape 101 apart into the two separate useful tapes, first tape 111, and second tape 121.

FIG. 1F is a drawing showing the 2-PLY tape 101 of FIG. 1A with an optional peel strip 137 on the edge of the second tape 121, where there is a strip without adhesive #2, alongside of the adhesive area 129 to facilitate separation of the first tape 111 and the second tape 121.

Figure 1G:
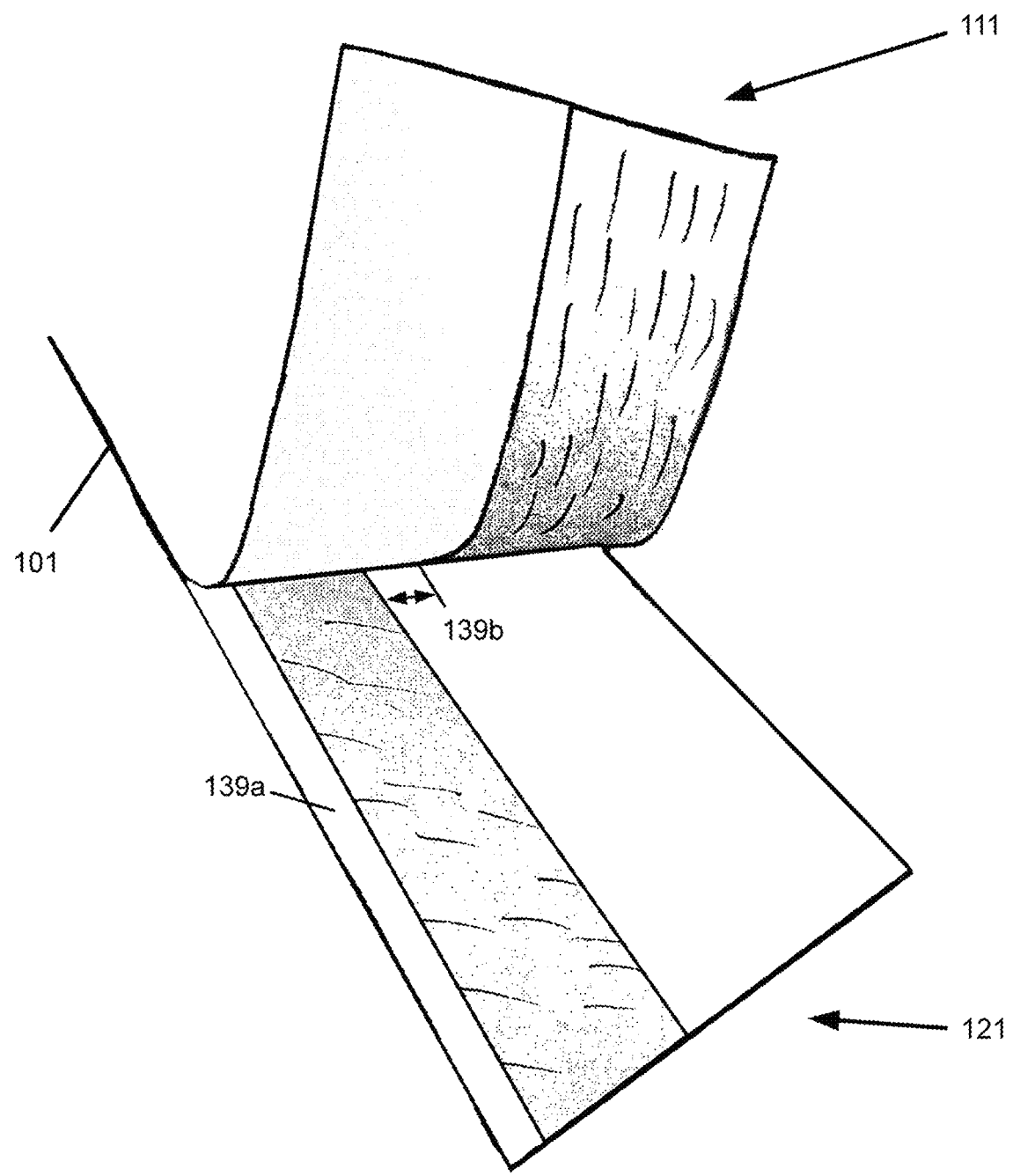
FIG. 1G is a drawing showing the 2-PLY tape of FIG. 1A with an optional peel strip and optional gap between adhesive #1 and adhesive #2.

FIG. 1G is a drawing showing the 2-PLY tape 101 of FIG. 1A with an optional peel strip 139a and a gap 139b between adhesive #1 and adhesive #2. The gap can facilitate manufacturing, because the registration accuracy of the PLYs can be relaxed by a portion of the gap 139b distance.

Universal Printer Applications—A 2-PLY tape according to the Application can be made so as to be universally usable by virtually any type of tape printer with single and/or double side printing capability. A 2-PLY tape according to the Application is particularly suited as a universal tape for virtually any type of printer and printer application because there is no outer adhesive. With no exposed outer adhesive on an outer surface of a 2-PLY tape as described herein, printer fouling, such as adhesive fouling of the paper track, cutter, cutting mechanism, and/or auto-cutter is substantially reduced or substantially eliminated. Both exposed outer surfaces of the 2-PLY security tape are substantially adhesive free to reduce or substantially eliminate adhesive fouling of a tape track and/or cutting mechanism of a printer.

There can also be more specialized 2-PLY tapes, where for example, one or both sides of the 2-PLY tape include a thermal sensitive print surface for thermal printing. There can also be one or both sides of the 2-PLY tape include an impact sensitive surface for impact printing. There can also be one or both sides of the 2-PLY tape include a surface suitable for accepting inkjet printing on one or both outer surfaces of the 2-PLY tape. There can also be one or both outer surfaces, which are suitable for more than one type of printing, such as, for example, inkjet and thermal printing, inkjet and impact printing, thermal printing and inkjet printing, and any combinations of thermal, impact, and ink printing. The outer surfaces of each PLY tape may also be pre-printed with logos, watermarks, notices and/or instructions to handlers, deliveryman or recipients of packages to which the tapes are attached.

Alternative Adhesive Strips

There can be any suitable arrangement of adhesive strips (and corresponding release layers). For example, while example 2 herein below describes an exemplary multi-lane 2-PLY tape with a receipt tape and a security tape, as previously described, there can be multi-lane 2-PLY tapes with any suitable first tape type and any suitable second tape type.

Adhesive Patterns

Alternatively, Adhesive #1 and/or adhesive #2 can be disposed in any suitable pattern from continuous areas, areas with side peel strips, discrete patches, lines, diagonal lines, chevrons, patterns, and combinations thereof. Exemplary patterns include dots, squares, triangles, stars, polygons, ovals, circles, rectangles, lines, diamonds and combinations thereof.

Pressure sensitive adhesives are well known in the art and can be based on acrylics, hot-melt, silicone rubbers and other base materials, and are described at length in treatises such as the Handbook of Pressure Sensitive Adhesive Technology by Donatas Satas (2d ed.). Types of commonly used pressure sensitive adhesives may be categorized in different ways, with some categories overlapping, and those types of adhesives include repositionable pressure sensitive adhesives, removable pressure sensitive adhesives, permanent pressure sensitive adhesives, heat-activated adhesives, UV curable adhesives, hot-melt adhesives, water-based adhesives, solvent based adhesives, rubber-based adhesives. While some pressure sensitive adhesives may be solvent based, or rubber based hot-melt materials, water based or waterborne pressure sensitive adhesives are frequently chosen for environmental and food contact applications. Selection, modification and application of pressure sensitive adhesives frequently requires substantial skill and experience to achieve the appropriate level of performance for a particular product. Depending upon the intended use or application of each PLY of the 2-PLY tape, adhesive #1 and/or adhesive #2 can be chosen based on tackiness, peel strength, shear strength, or on the texture, roughness, composition, coatings, or surface energy of the material to which each PLY is attached.

While a repositionable adhesive (RPA) is frequently based on polymeric microspheres, other pressure sensitive adhesives formed of acrylic polymer emulsions are removable for short periods, for example, between about 30 seconds and two hours and may also be substituted for repositionable microsphere based adhesives. Additionally, patterns of small amounts of traditional pressure sensitive adhesives can be distributed across a relatively larger area to render an adhesive repositionable. Furthermore, deadening agents may be applied over an area of pressure sensitive adhesive to modify a traditional hot melt, acrylic or silicone based adhesive to achieve the desired effect and performance. It is within the scope of the invention to utilize any of these adhesives as appropriately modified and applied for either adhesive #1 applied to a printable receipt or label or adhesive #2 for functioning as a tamper resistant or tamper evident security tape.

A permanent pressure sensitive adhesive is generally not removable without destruction of the tape or label, or substrate to which it is applied. Additionally, many applications for use as a security tape or label may require permanent adhesives with resistance to environmental exposures such as heat, cold, moisture, chemicals and solvents. Other applications may require permanent adhesives to be adhered to paper, plastic, metallic or filmic substrates.

While the embodiments of the invention may generally identify a repositionable adhesive on the inner surface of the printable first tape to function as repositionable label, and a permanent adhesive on the inner side of the second tape to function as a security tape, it is within the scope of the invention to select, modify and apply one or more adhesives on each tape to fit the performance requirements for the end use.

2-PLY Tape Types

The first tape can be the same as or different from the second tape type. For example, there can be a 2-PLY tape with two security tapes, or with two receipt tapes. Any of the 2-PLY tapes described herein can have any suitable combination of any suitable types or functions of tapes.

EXAMPLE 1

2-PLY Tape with Register Receipt and Security Tape

FIG. 2A is a drawing showing an exemplary 2-PLY tape 201 according to the Application. The outer surfaces of the 2-PLY tape may be printable or pre-printed with suitable information. The point of sale or register printer prints the receipt on any suitable type receipt surface by any suitable printing means. For example, it is common to print receipts by a thermal print technique onto a thermally sensitive layer. However, the top layer could be paper or an equivalent material suitable to accept a printed ink from a thermal transfer, laser, impact, or ink jet, or other suitable printer. FIG. 2B is a drawing showing the receipt part of the 2-PLY tape of FIG. 2A. FIG. 2C is a drawing showing exemplary layers of the receipt part of the 2-PLY tape of FIG. 2A. FIG. 2D is a drawing showing the security tape part of the 2-PLY tape of FIG. 2A. FIG. 2E is a drawing showing exemplary layers of the security tape part of the 2-PLY tape of FIG. 2A.

As can be seen in FIG. 2A, following printing, the 2-PLY tape of FIG. 2A pulls apart yielding in a first part, the printed receipt 211, and the in the second part the security tape 221. Once separated, the printed receipt 211 can be removably affixed to a bag or package by any suitable adhesive, such as a repositionable adhesive (RPA). Similarly, the security tape can be affixed to seal a package or bag by a permanent adhesive. The security tape adhesive either causes the security tape to tear if removed, or can be based, for example on cohesion, where once removed, the efficacy of the adhesive is lowered to a point where when reattached, the holding force is so significantly reduced, there is a positive indication that the security tape has been removed at least once.

According to FIG. 2A to FIG. 2E, the 2-PLY tape pulls apart where the adhesive of the receipt is one side of the tape in the long or longitudinal direction of the tape, and the adhesive of the security tape is on the other side. It is unimportant if either or both sides meet in the middle and/or if there are areas clear of adhesive on either outer side of one or both of the strips in the long direction (not shown in FIG. 2A to FIG. 2E).

FIG. 2C shows an exemplary structure suitable for use for the register ply of the 2-PLY tape of FIG. 2A. The print layer 213 can be any suitable thermosensitive layer printed by a thermal printer, or paper layer which can accept ink from any other suitable printer. There can be any suitable optional protective layer or optional top layer over the print layer (not shown in FIG. 2C). There is usually an optional primer that can act as a base coat and/or tie coat 215 layer disposed between the adhesive area 219 and the substrate. A base coat may prevent solvents from a solvent-based adhesive area from damaging or distorting the thermo-reactive dies in a thermal printing layer. A tie coat may be applied as a transitional layer that bonds or improves the adhesion of the adhesive to the substrate. It is unimportant of the base coat or tie coat is over the entire surface underneath the print layer as shown in FIG. 2C, or only on the part of the receipt between the adhesive area and the print layer of the substrate (not shown in FIG. 2C). On the same side of the receipt, but adjacent longitudinally to the adhesive layer, is a release area 217 to release the receipt from the adhesive area 219 of the security tape (left side, FIG. 2E) of the second ply of the 2-PLY tape 201. Now, turning to FIG. 1E, the security tape has a typically pre-printed tape (company information, product information, company logo, combinations thereof, etc.) on the outside visible surface of the 2-ply tape (when still in the 2-ply) opposite to the printed side of the receipt. The adhesive area 229 and the release area 227 are opposite the release area 217 of the receipt, and the adhesive area 219 of the receipt and both similarly run in the longitudinal direction of the tape 201. There can also be an optional base coat disposed between the printed layer and either or both of the adhesive area and the release area (optional base coat of a security tape not shown in FIG. 2E). In FIG. 2E, the security tape has a typically pre-printed tape with a printed surface 223 (company information, product information, company logo, notices, or combinations thereof, etc.) on the outside visible surface of the 2-ply tape.

EXAMPLE 2

Multi Lane 2-PLY Tape

Another exemplary 2-PLY tape with a repositionable receipt and security tape is shown in FIG. 3A to FIG. 3E as a multi lane 2-PLY tape.

FIG. 3A is a drawing showing another exemplary 2-PLY tape 301 according to the Application. Instead of the release area being longitudinally adjacent to the adhesive area as shown in FIG. 2A, now there are longitudinal lanes of adhesive and release layers. In the exemplary 2-PLY tape 301 of FIG. 3A, the adhesive area 219 of the receipt runs longitudinally between two lanes of release area 217, while one lane of release area 227 is about in the center longitudinally of the 2-PLY tape 301 on the security tape ply, and there are two lanes 229 running longitudinally on either side of the security tape ply. There can be any suitable number of lanes side by side or interlaced (not shown in FIG. 3A). The printed side of both of the receipt 311 printed by the register printer, and the security tape 221, typically pre-printed are visible on the outside top and bottom surfaces of the 2-PLY tape. The register printer prints the receipt 311 on any suitable type receipt surface by any suitable printing means. For example, it is common to print receipts by a thermal print technique onto a thermally sensitive layer. However, the top layer could be paper or an equivalent material suitable to accept a printed ink from any suitable printer. FIG. 3B is a drawing showing the receipt part of the 2-PLY tape of FIG. 3A. FIG. 3C is a drawing showing exemplary layers of the receipt part of the 2-PLY tape of FIG. 3A. FIG. 3D is a drawing showing the security tape part of the 2-PLY tape of FIG. 2A. FIG. 2E is a drawing showing exemplary layers of the security tape part of the 2-PLY tape of FIG. 3A.

As can be seen in FIG. 2A, following printing, the 2-PLY tape of FIG. 2A pulls apart yielding in a first part, the printed receipt 311, and the in the second part the security tape 321. Once separated, the printed receipt 311 can be removably affixed to a bag or package by any suitable adhesive, such as a repositionable adhesive (RPA). Similarly, the security label can be affixed to seal a package or bag by a permanent adhesive. The security label adhesive either causes the security label to tear if removed, or can be based, for example on cohesion, where once removed, the efficacy of the adhesive is lowered to a point where when reattached, the holding force is so significantly reduced, there is a positive indication that the security label has been at least once removed.

According to FIG. 3A to FIG. 3E, the 2-PLY tape pulls apart where the adhesive 219 of the receipt 311 is about in the middle of the tape in the long or longitudinal direction of the tape, and the adhesive 229 of the security tape is on either side. It is unimportant if either or both sides meet and/or if there are areas clear of adhesive on either outer side of one or both of the strips in the long direction (not shown in FIG. 1A to FIG. 1E).

FIG. 3C shows an exemplary structure suitable for use for the register ply of the 2-PLY tape of FIG. 3A. The print layer 213 can be any suitable thermosensitive layer printed by a thermal printer, or paper layer which can accept ink from an ink jet printer. There can be any suitable optional protective layer or optional top layer over the print layer (not shown in FIG. 3C). There is usually an optional primer coat 215 that may be either a base coat, tie coat, or both, layer disposed between the adhesive area 219 and the printed layer, such as to prevent solvents from a solvent based adhesive layer from damaging or distorting the printed layer, or creating a better bond between the adhesive and the substrate or printed layer. It is unimportant of the base coat is over the entire surface underneath the print layer as shown in FIG. 3C, or only on the part of the receipt between the adhesive area and the print layer (not shown in FIG. 3C). On the same side of the receipt, but adjacent longitudinally to the adhesive layer, is a release area 217 to release the receipt from the adhesive area 219 of the security tape (left side, FIG. 3E) of the second PLY of the 2-PLY tape 301. Now, turning to FIG. 3E, the security tape has a typically pre-printed tape with a printed surface 223 (company information, product information, company logo, notices, or combinations thereof, etc.) on the outside visible surface of the 2-ply tape (when still in the 2-ply) opposite to the printed side of the receipt 311. The adhesive area 229 and the release area 227 are opposite the release area 217 of the receipt, and the adhesive area 219 of the receipt and both similarly run in the longitudinal direction of the tape 301. There can also be an optional primer coat disposed between the printed layer and either or both of the adhesive area and the release area (optional base coat of a security tape not shown in FIG. 3E).

EXAMPLE 3

Alternative 2-PLY Tape Based on a Linered Security Tape Structure

FIG. 4A to FIG. 4E show yet another approach to achieve a 2-PLY tape. FIG. 4A is a drawing showing another exemplary 2-PLY tape 401 according to the Application. In FIG. 4A to 4E, a 2-PLY tape 401 can be made from a conventional linered tape. Here, the conventional tape structure includes a pre-printed security tape with an adhesive backed by a removable liner. It was realized that a printable surface can be made on top of the surface of the removable liner 407 (FIG. 4C) opposite to the visible printed face of the security tape 321. The printable surface can be provided any suitable technique, including adding a thermal print layer (by adding a thermally sensitive material), a printable surface printable by the ink from an inkjet printer, etc. In this way, the previously disposable liner of the security tape now becomes a printable receipt of a 2-PLY tape 401.

The printed side of both of the receipt 411 printed by the register printer, and the security tape 421, typically pre-printed are visible on the outside top and bottom surfaces of the 2-PLY tape. The register printer prints the receipt 411 on any suitable type receipt surface by any suitable printing means. For example, it is common to print receipts by a thermal print technique onto a thermally sensitive layer. However, the top layer could be made of a paper, a cellulose, or an equivalent material deposited or formed on the outside surface of the liner 407, and suitable to accept a printed ink from an ink jet register printer. FIG. 4B is a drawing showing the receipt part of the 2-PLY tape of FIG. 4A. FIG. 4C is a drawing showing exemplary layers of the receipt part of the 2-PLY tape of FIG. 4A. FIG. 4D is a drawing showing the security tape part of the 2-PLY tape of FIG. 4A. FIG. 4E is a drawing showing exemplary layers of the security tape part of the 2-PLY tape of FIG. 4A.

As can be seen in FIG. 4A, following printing, the 2-PLY tape of FIG. 4A pulls apart yielding in a first part, the printed receipt 411, and the in the second part the security tape 421. Once separated, the printed receipt 411 can be stapled, glued, or taped to a bag or package, or handed directly to the customer. Similarly, the security tape 421 can be affixed to seal a package or bag by a permanent adhesive. The security tape adhesive 429 either causes the security tape to tear if removed, or can be based, for example on cohesion, where once removed, the efficacy of the adhesive is lowered to a point where when reattached, the holding force is so significantly reduced, there is a positive indication that the security tape has been at least once removed. The printed receipt can also be secured or affixed to a surface, bag, box, etc. by a portion of the security tape (e.g. receipt part way under the security tape).

According to FIG. 4A to FIG. 4E, the 2-PLY tape pulls apart where the adhesive 429 of the security tape pulls away from the printed receipt 411.

FIG. 4C shows an exemplary layer structure suitable for use for the register ply of the 2-PLY tape of FIG. 4A. The print layer 413 can be any suitable thermosensitive layer printed by a thermal printer, or paper layer which can accept ink from any suitable printer. There can be any suitable optional protective layer or optional top layer over the print layer (not shown in FIG. 4C). There could be an optional primer coat which can function as a base coat, a tie coat or both disposed between the print layer and the liner (not shown in FIG. 4C). The release layer 417 releases the printed receipt from the adhesive layer 429 of the security tape (FIG. 4E) of the second PLY of the 2-PLY tape 401. Now, turning to FIG. 4E, the security tape has a typically pre-printed tape with a printed surface 423 (company information, product information, company logo, combinations thereof, etc.) on the outside visible surface of the 2-PLY tape (when still in the 2-PLY) opposite to the printed side of the receipt 311. The adhesive layer 429 is opposite the release layer 417 of the receipt in the longitudinal direction of the tape 401. There can also be an optional base coat disposed between the printed layer and either or both of the adhesive layer and the release layer (optional base coat of a security tape not shown in FIG. 4E).

Scoring of the Security label—Any of the pre-printed security tapes described hereinabove can be pre-scored (not shown in the drawings) by any suitable scoring method, such as, for example, cuts made through substantially only the print layer of the security tape. Such scoring serves to break apart the security tape to more positively show if there has been an attempt to remove or actual removal of part or all of the label once affixed to a surface to be secured, typically a wrap, package, or bag containing a food product. However, the security labels of the Application are suitable for security applications other than food products, such as, for example, more generally sealing product packages and/or boxes.

Figure 6B:
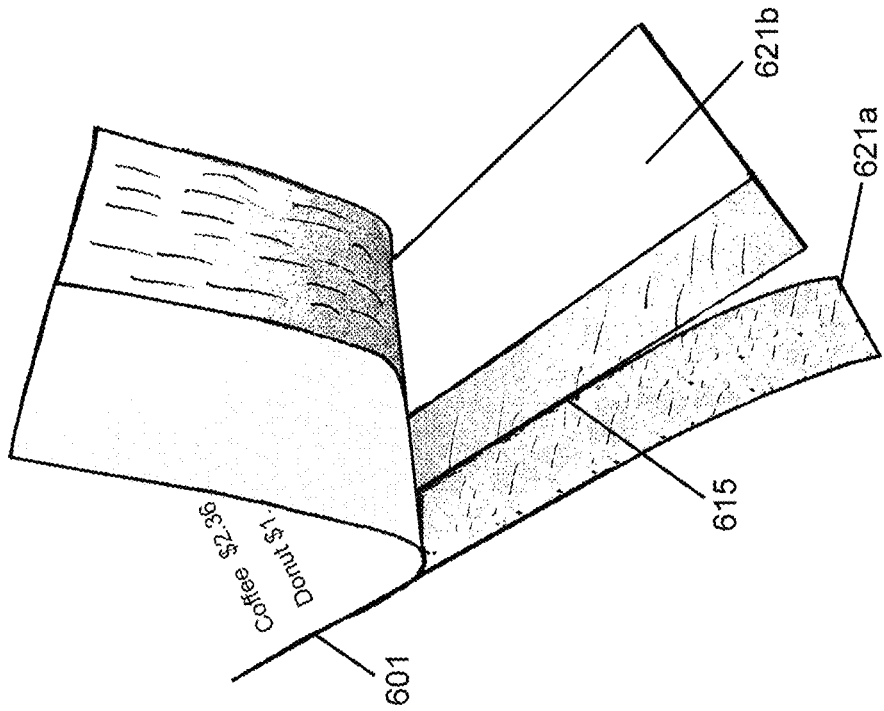
FIG. 6B is a drawing showing the second tape PLY security tape of FIG. 6A separated along the crack line.
Figure 6A:
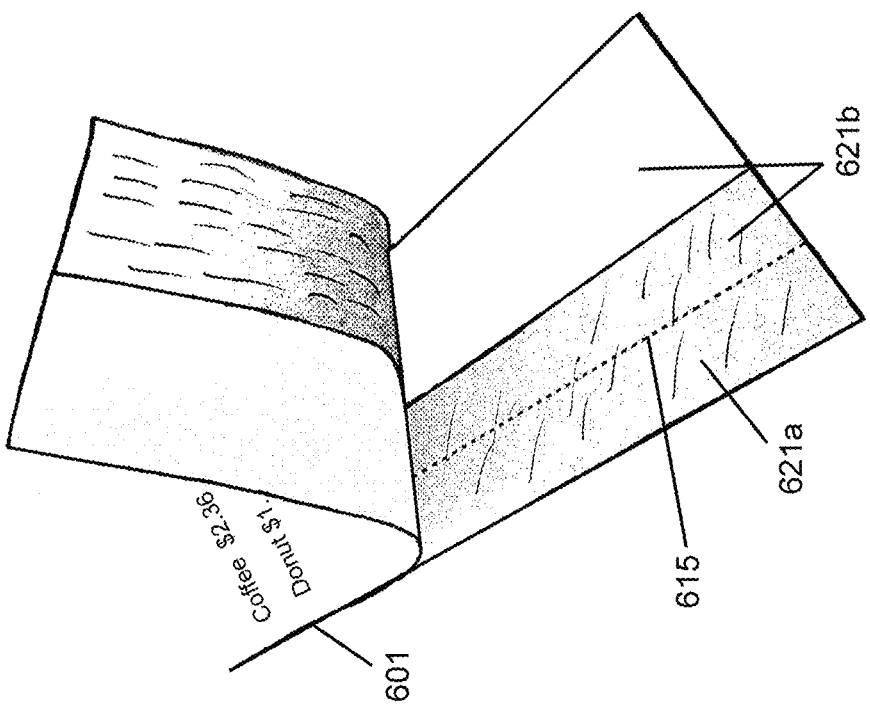
FIG. 6A is a drawing showing an exemplary printable 2-PLY security tape according to the Application with a crack line, score, or perforation, etc. through adhesive #2 of the second tape PLY security tape.

Cracking of the Security label—Any of the tapes described hereinabove can be cracked lengthwise. FIG. 6A is a drawing showing an exemplary printable 2-PLY security tape according to the Application with a crack line 615, score, or perforation, etc. through adhesive #2 of the second tape PLY security tape. The cracked security tape 601 can yield two different security tapes 621*a*, 621*b* from a second tape PLY security tape. FIG. 6B is a drawing showing the second tape PLY security tape of FIG. 6A separated along the crack line 615.

Figure 7B:
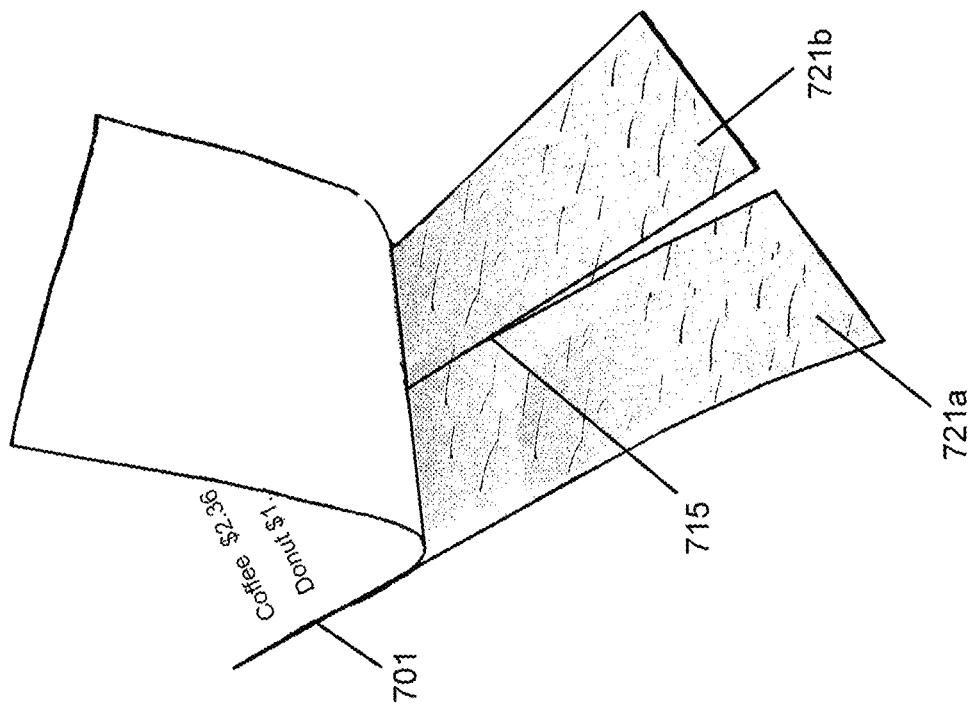
FIG. 7B is a drawing showing the linered security tape of FIG. 7A separated along the crack line.
Figure 7A:
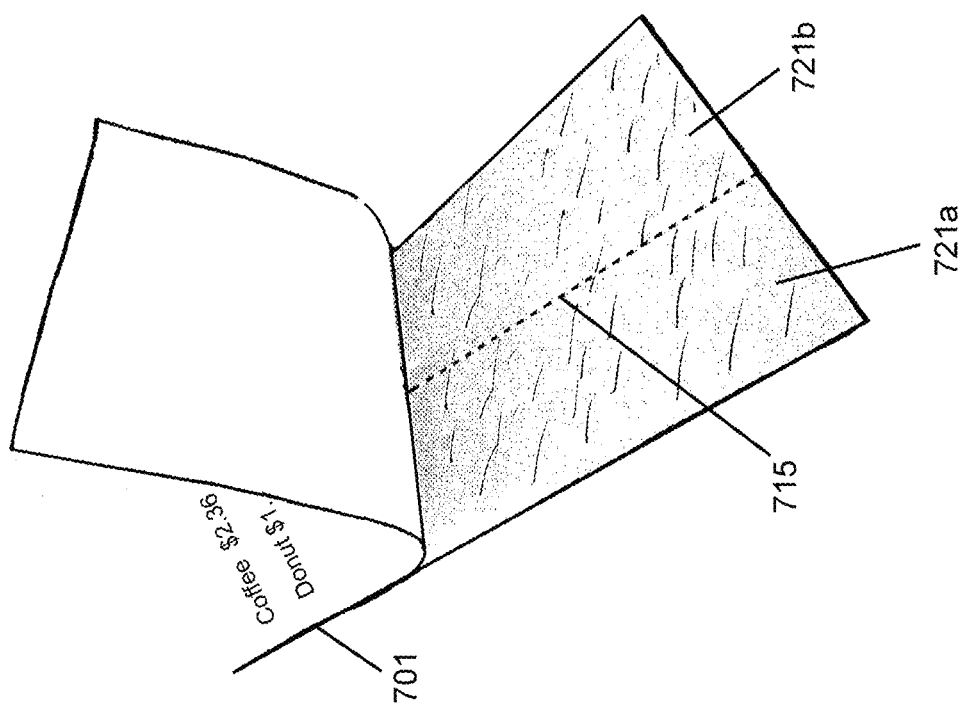
FIG. 7A is a drawing showing an exemplary tape based on the linered security tape structure of FIG. 4A, with a crack line, score, or perforation, etc. through the adhesive layer of the security tape.

Similarly, FIG. 7A is a drawing showing an exemplary tape based on the linered security tape structure of FIG. 4A to FIG. 4E, with a crack line 715, score, or perforation, etc. through the adhesive layer of the security tape. The cracked security tape 701 can yield two different security tapes 721*a*, 721*b* from the security tape. FIG. 7B is a drawing showing the printable 2-PLY security tape of FIG. 7A separated along the crack line 715.

Typically, the 2-PLY tapes of the Application are supplied in roll form, such as for POS register printers. However, 2-PLY tapes of the Application can be supplied in any suitable form, including, for example, folded, web, cut, etc.

Typically, the 2-PLY tapes of the Application as tape for POS printers can be printed as continuous length labels (any suitable length to print the desired receipt and/or security label. Labels according to the Application can be made as one continuous label. Such labels can be particularly suitable for use in batch printing labels where a printer has a cutter and the operator wants to create variable length labels.

Labels cut from tapes according to the Application can also be made to work with a printer which has a gap sensor to read the position of the label in the printer. Alternatively, it is contemplated that tapes can include a black top-of-form mark in place of, or in addition to a gap sensor for printers that reads a black mark vs. a gap (e.g. between successive die-cut labels).

Materials and Manufacturing Techniques

Adhesive patterns: Any suitable pattern of adhesive can be used ranging from a continuous coverage of the surface, a partial coverage of the surface, to deposits or patterns of adhesive on the surface surrounded and/or separated by adhesive free areas. Suitable patterns of adhesive include continuous longitudinal strips lanes and discontinuous strips or lanes. Discontinuous strips or lanes can include any suitable patterns. Suitable patterns include, for example, diagonal lines, chevrons, stars, squares, triangles, rectangles, polygons, etc. and combinations thereof.

Adhesive area—A microsphere type adhesive can be used. Microspheres can be a GelTac 101A series adhesive, such as, for example, is available from HB Fuller, Royal Adhesives of Syracuse, N.Y.

Figure 5A:
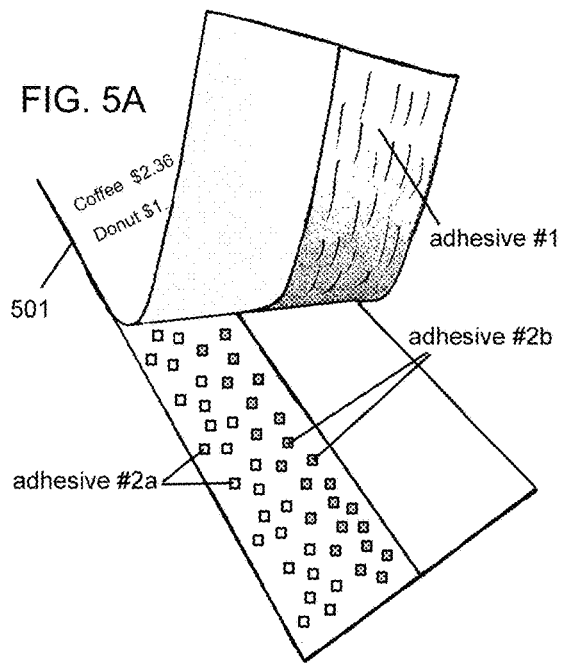
FIG. 5A is a drawing showing a plurality of square patterned adhesives for adhesive areas #2 including an adhesive #2a and a different type of adhesive #2b.
Figure 5B:
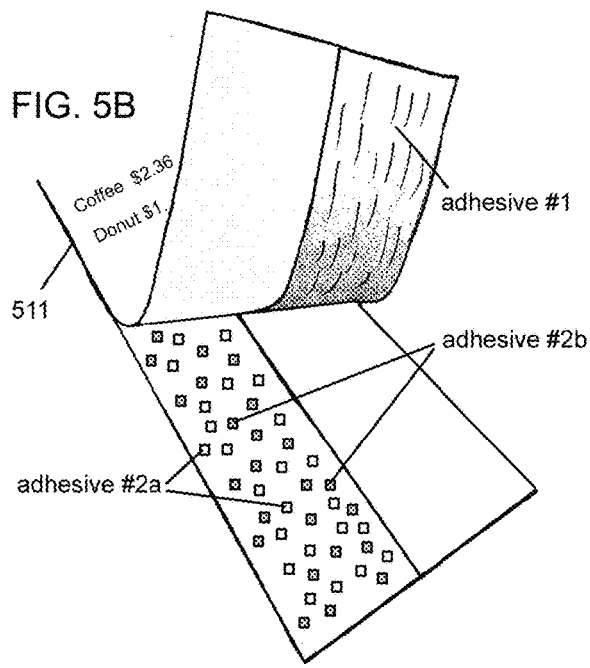
FIG. 5B is a drawing showing intermixed square patterns of two or more different types of adhesives as adhesive #2a, adhesive #2b.
Figure 5C:
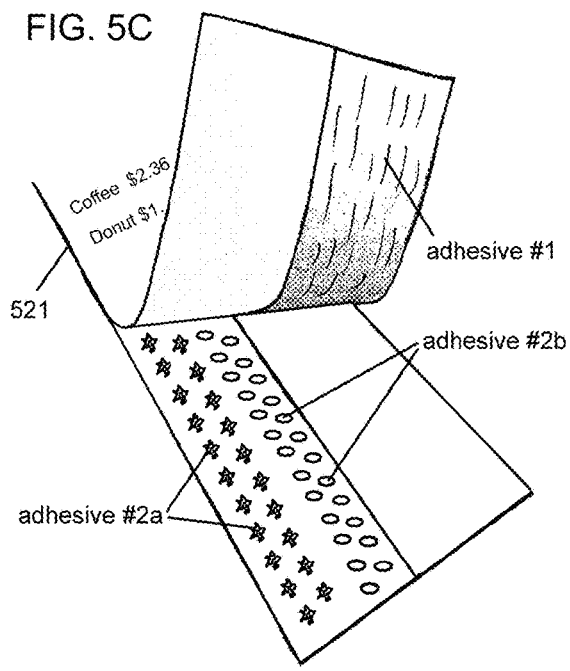
FIG. 5C shows rows of two different patterns, each pattern with a different type of adhesive, adhesive #2a and adhesive #2b.
Figure 5D:
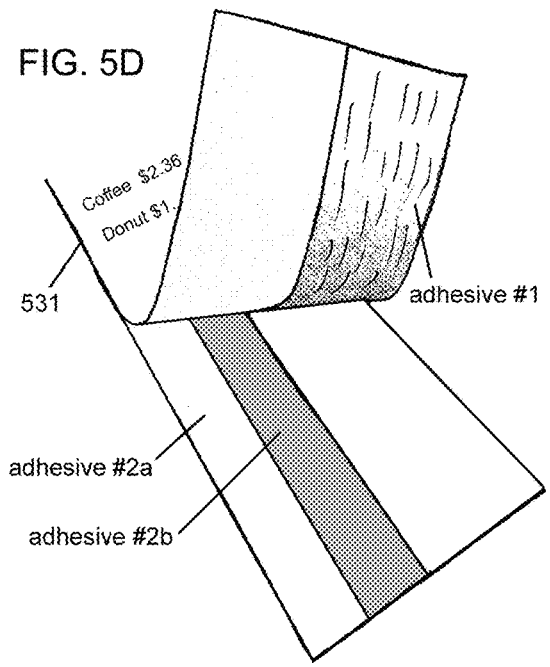
FIG. 5D is a drawing showing lanes of different types of adhesives, adhesive #2a, adhesive #2b.

FIG. 5A to FIG. 5D show examples of how two or more different types of adhesives can be used for adhesive #1 and/or adhesive #2. FIG. 5A is a drawing showing an exemplary 2-PLY tape 501 having a plurality of exemplary square patterned adhesive areas for adhesive #2 including an adhesive #2*a* and different type of adhesive #2*b*. For example, a repositionable adhesive can be combined with a permanent adhesive. Any two or more suitable types of adhesives can be used. FIG. 5A shows rows of different types of adhesive. Alternatively, FIG. 5B is a drawing showing an exemplary 2-PLY tape 511 having an exemplary intermixed square patterns of two or more different types of adhesives, here as adhesive #2a, adhesive #2b. Any suitable patterns or mix of different patterns can be used. FIG. 5C is a drawing of an exemplary 2-PLY tape 521 having shows rows of two different patterns, each pattern with a different type of adhesive, adhesive #2a and adhesive #2b. FIG. 5D is a drawing showing an exemplary 2-PLY tape 531 having exemplary lanes of different types of adhesives, adhesive #2a, adhesive #2b.

Different types of adhesives and adhesive patterns and/or adhesive lanes can be used in the alternative 2-PLY tape based on a linered security tape structure of FIG. 4A to FIG. 4E.

Primer area—An optional primer can be disposed between the adhesive and the substrate. Any suitable primer can be used, such as, for example GelTac PR-04DF2 primer coating available from HB Fuller.

Release area—An exemplary release material is a non-silicone based release composition available from Omnova. Any suitable silicone based releases can also be used.

Permanent adhesive area—Typically, the security tape (121, 221, 321) can use any suitable permanent adhesive. Exemplary suitable permanent adhesives include, for example, Engineered Polymer Solutions Acrylic Emulsion 2127 Engineered Polymer Solutions of Marengo, Ill.

In some applications, the security tape can be a cohesive, such that the tackiness or stickiness reduces if first attached to a surface and then pulled off in whole or in part. That way, any second attempt to attach or re-attach the security label results in no adhesion or reduced adhesion to evidence a tamper of the security label.

Cohesion adhesives—Exemplary suitable cohesion adhesives include, for example, Craig/Royal Adhesives 4095 LFI Self Seal 1G083R available from HB Fuller, Royal Adhesives of Syracuse, N.Y.

Typically, there can be continuous side-by-side strips or lanes of adhesives, such as, for example, adjacent, interleaved, etc. Typically, each lane or strip is continuous in the longitudinal direction; however, there is no need for continuous adhesive strips or lanes. Any suitable broken pattern can also be used for either or both of the receipt adhesive when present (e.g. printed receipts 111, 211) and/or the security tapes (e.g. security tapes 121, 221, and 321).

There can be strips or lanes adjacent to one or both sides of the 2-PLY tape in the longitudinal direction for ease of handling to minimize adhesive transfer to the hands of persons working with the 2-PLY labels before and after printing when the PLYs are separated into the first PLY receipt and the second PLY security label.

Instead of longitudinal strips or lanes, there can also be interleaved or interspersed patterns of strips that are perpendicular or angled to the longitudinal direction of the tape.

It is understood that the print layers described hereinabove include a label substrate (included as part of the print layers described hereinabove). The media for the label substrates can be any suitable label substrate media. Suitable substrate materials include, for example, any suitable paper, ink jet substrates, thermal transfer substrates, polyvinyl, any suitable films including, for example, paper films, cellulose films, plastic films, metal films, etc. It is also understood that print layers, particularly thermally printed labels, include a thermally sensitive material. Print layers can also optionally include any suitable top coat.

Topcoat—Exemplary suitable protective topcoats include vinyl acetate copolymer emulsion, and styrene acrylic copolymer.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art that are also intended to be encompassed by the following claims.

What is claimed is:

1. A 2-ply composite tape comprising:
   a first point of sale printer register tape ply comprising
      a first substrate having a first substrate outer surface as a first outer ply surface, and
      a first inner ply surface comprising
         at least one first release area disposed on an inside surface of said first substrate, and
         at least one first repositionable adhesive area disposed on a first lateral area on said inside surface of said first substrate;
   a second security tape ply comprising
      a second substrate having a second substrate outer surface as a second outer ply surface, and
      a second inner ply surface comprising
         at least one second release area disposed on an inner surface of said second substrate, and
         at least one second permanent adhesive area disposed on a second lateral area of said printable 2-ply security tape different from said first lateral area and on said inner surface of said second substrate.

2. The 2-ply composite tape of claim 1, wherein at least one of said first substrate outer surface and said second substrate outer surface comprises a printed or printable surface.

3. The 2-ply composite tape of claim 1, wherein said first tape ply comprises a printable receipt tape, said second tape ply comprises a security tape.

4. The 2-ply composite tape of claim 3, wherein said first tape ply is removably coupled to said second tape ply such that following a printing of said first tape ply of said printable receipt tape, said second tape ply is removable from said 2-ply composite tape as an adhesively backed security label.

5. The 2-ply composite tape of claim 4, wherein said at least one second permanent adhesive comprises one or more continuous or discontinuous longitudinal strips or lanes of a continuous or patterned adhesive.

6. The 2-ply composite tape of claim 3, wherein said at least one first repositionable adhesive area comprises one or more continuous or discontinuous longitudinal strips or lanes of a continuous or patterned adhesive.

7. The 2-ply composite tape of claim 1, wherein both exposed outer surfaces of said 2-ply composite tape are substantially adhesive free to reduce or substantially eliminate an adhesive fouling of a tape track and/or cutting mechanism of a printer.

8. The printable 2-ply security tape of claim 1, wherein a base coat is further disposed between said first substrate and said first repositionable adhesive area.

9. A printable 2-ply point of sale register tape with security tape comprising:
   a first tape PLY point of sale printer register label stock comprising
      a first substrate having a first substrate printable outer surface as a first outer ply surface, and a first inner ply surface comprising
at least one first release area disposed on an inside surface of said first substrate, and
at least one first repositionable adhesive area disposed on a first lateral area of said inside surface of said first substrate;
a second tape ply security tape comprising
a second substrate having a second substrate outer surface as a second outer ply surface, and
a second inner ply surface comprising
at least one second release area disposed on an inner surface of said second substrate, and
at least one second permanent adhesive area disposed on a second lateral area of said printable 2-ply security tape different from said first lateral area and on said inner surface of said second substrate;
said second permanent adhesive area in contact with said first release area and said first adhesive area in a contact with said second release area, to form a 2-ply composite tape.

10. The printable 2-ply security tape of claim 9, comprising a pre-printed printable outer surface.

11. The printable 2-ply security tape of claim 9, comprising a pre-printed security tape.

12. The printable 2-ply security tape of claim 9, wherein either or both of said at least one first adhesive area and said at least one second adhesive area comprise two or more lanes.

13. The printable 2-ply security tape of claim 9, wherein either or both of said at least one first adhesive area and said at least one second adhesive area comprise a plurality of adhesive patterns.

14. The printable 2-ply security tape of claim 13, wherein said plurality of adhesive patterns comprises at least a selected one of dots, squares, triangles, stars, polygons, ovals, circles, rectangles, lines, and combinations thereof.

15. The printable 2-ply security tape of claim 13, wherein said plurality of adhesive patterns comprises diagonal adhesive lines or adhesive lines as chevrons.

16. The printable 2-ply security tape of claim 9, wherein either or both of said first tape ply label stock and said second tape ply security tape comprises an area free of adhesive as a peel strip.

17. The printable 2-ply security tape of claim 9, wherein there is a lane free of any adhesive disposed between said first adhesive area and said second adhesive area.

18. The printable 2-ply security tape of claim 9, wherein both exposed outer surfaces of said printable 2-ply security tape are substantially adhesive free to reduce or substantially eliminate an adhesive fouling of a tape track and/or cutting mechanism of a printer.

19. The printable 2-ply security tape of claim 9, wherein a base coat is further disposed between said first substrate and said first repositionable adhesive area.

* * * * *